Patented Sept. 17, 1929

1,728,296

UNITED STATES PATENT OFFICE

ALBERT E. MARSHALL, OF BALTIMORE, MARYLAND, ASSIGNOR TO MARYLAND PIGMENTS CORPORATION, OF BALTIMORE, MARYLAND, A CORPORATION OF MARYLAND

PROCESS OF MAKING A WHITE-PIGMENT BASE

No Drawing.    Application filed December 1, 1923. Serial No. 677,978.

This invention relates to a new titanium pigment and process of making the same.

It has hitherto been proposed to manufacture white pigments from titanium oxide as a base, by first separating a substantially pure white titanium oxide from a suitable raw material, or by preparing a pure solution of a titanium salt, and then adding thereto an inert white material, stable to light, in order to secure the desired white pigment. It has also been proposed to secure such a result by the simultaneous precipitation of titanium oxide and an inert white material, from a solution containing a substantially pure soluble titanium salt and another salt providing the desired inert base; as, for example, the addition of barium hydrate to a solution of acid titanium sulphate and the precipitation on boiling of an admixture of titanium oxide and barium sulphate. Inasmuch as these general methods of preparation involve the separation of substantially pure titanium oxide or the preparation of pure salts of titanium, the cost of manufacture was high because of the multiple series of operations and often the use of more or less expensive chemicals.

My invention has accordingly as an object the avoidance of these difficulties in such a manner as to very markedly reduce the cost of manufacture and at the same time provide a simple process of manufacturing a white titanium pigment of high purity as regards color, and also having a relatively high titanium content. In fulfilling this object I have conceived of the idea of proceeding directly from the ilmenite sands and manufacturing therefrom a white pigment without preliminary isolation of titanium oxide. The fact that silica which is a natural constituent of ilmenite sands, is in its pure state a white substance like titanium oxide, and stable to light, makes it at once a very desirable and a cheap component or extender of the titanium oxide pigment. The simplicity and technical value of this idea will now be apparent when it is considered that thereby a separation of the titanium oxide is avoided and the cost of the product is very materially reduced without sacrifice of the color or quality of the resulting product. Not only have I provided a new and valuable pigment obtainable in large quantities, but I have also, in pursuing this object, been able to eliminate the objectionable iron component of the ilmenite sands by a process which I will now describe.

As a preferred but not exclusive method of procedure I take ilmenite sand containing, for example, from 20 to 50% ilmenite and from 50 to 80% silica, and grind it to a fineness of 60 mesh or finer, and thereupon subject it to the action under suitable conditions of phosgene gas, otherwise known as carbonyl chloride. The process is regulated to eliminate the iron by volatilization and the ferric chloride which distills over may be collected in a suitable condensing system and recovered therefrom.

The residue, which by one mode of treatment may consist of a mixture of 12 to 27% titanium oxide and 73 to 88% silica, is a dark grey material. This may be converted into a suitable pigment base by an appropriate treatment; as, for example, by fusion with an alkali such as sodium carbonate, dissolution of the fused mass in water, and treatment with a mineral acid like sulphuric, followed by boiling. In this manner a precipitate of titanium oxide and silica will be obtained in a pure white form, and this may thereafter be dried or calcined as desired. It is to be understood that the above procedure of removing the iron, while highly advantageous and preferred, may be modified by using other processes; as, for example, by treating the sands with a mixture of chlorine and hydrochloric acid gases, or chlorine and carbon monoxide gases, or by evaporating and leaching the product resulting from the treatment of ilmenite sand with sulphuric acid at or close to the boiling point, or by the fusion of ilmenite sand with an alkali and the conversion of the iron to the ferric state with sulphur dioxide so that the iron remains in solution.

While ilmenite sands have been given as a preferred raw material it is to be understood that other minerals containing silica and titanium may be similarly employed. Since the composition of such ilmenite sands and other raw materials varies to some extent, the respective percentages of ingredients in the products will also vary and, therefore, in order to obtain uniformity in composition of the final product, if so desired, I may proceed by selecting a specially chosen mineral as ilmenite sand as a starting point after analysis of the same, or I may compound known materials in order to secure a definite result as, for example, by taking definite proportions of a high and low titanium ilmenite sand in order to secure the desired percentage of titanium oxide in the final white pigment.

As many apparently widely different embodiments of my invention may be made without departing from the spirit thereof, it is to be understood that I do not intend to limit myself to the specific embodiments described except as defined in the following claims.

I claim:—

1. The process of making a white pigment base which comprises the step of treating minerals containing substantial amounts of silica and titanium oxide to remove iron therefrom and leave the silica and titanium oxide.

2. The process of making a white pigment base which comprises the step of treating ilmenite sand containing silica to remove iron therefrom and leave the silica and titanium oxide.

3. The process of making a white pigment base which comprises treating minerals containing substantial amounts of silica and titanium oxide with phosgene to remove iron therefrom and leave the silica and titanium oxide.

4. The process of making a white pigment base which comprises the step of treating ilmenite sand containing silica with phosgene to remove iron therefrom and leave the silica and titanium oxide.

5. The process of making a white pigment base which comprises the steps of treating ilmenite sand containing silica with phosgene gas to remove iron therefrom, fusing the remaining silica and titanium oxide with an alkali, and then precipitating these oxides to obtain a pure white pigment base.

In testimony that I claim the foregoing, I have hereunto set my hand this 27th day of November, 1923.

ALBERT E. MARSHALL.